United States Patent [19]

Bourne et al.

[11] 4,051,884
[45] Oct. 4, 1977

[54] PNEUMATIC TIRE CONTAINING GEL LUBRICANT

[75] Inventors: Alan John Bourne, Sutton Coldfield; Trevor John Walton, Tamworth, both of England

[73] Assignee: Dunlop Limited, London, England

[21] Appl. No.: 634,847

[22] Filed: Nov. 24, 1975

[30] Foreign Application Priority Data
Dec. 4, 1974 United Kingdom ............... 52342/74
Aug. 19, 1975 United Kingdom ............... 34509/75

[51] Int. Cl.² ..................... B60C 17/00; B60C 21/08
[52] U.S. Cl. .......................... 152/330 L; 152/330 RF; 152/347; 252/28; 260/37 AL; 106/33
[58] Field of Search ............ 152/330 L, 330 RF, 347; 252/27, 28; 106/33; 260/37 AL

[56] References Cited
U.S. PATENT DOCUMENTS

| | | |
|---|---|---|
| 3,718,614 | 2/1973 | Smyth ............................. 260/37 AL |
| 3,739,829 | 6/1973 | Powell et al. .................... 152/330 L |
| 3,920,061 | 11/1975 | Japp et al. ........................ 152/330 L |
| 3,946,783 | 3/1976 | Edwards et al. ................. 152/330 L |

*Primary Examiner*—Drayton E. Hoffman
*Attorney, Agent, or Firm*—Stevens, Davis, Miller & Mosher

[57] ABSTRACT

A lubricant gel is made from a poly(alkylene oxide) lubricant, a finely divided silica and a gel-strengthening amount of an ionic salt having a pH of 5.5–8.5 when in 0.1 M aqueous solution. The gel is useful in the inflation chamber of a pneumatic tire to enable it to run safely in a deflated condition for which purpose the gel should have the required viscosity and mechanical stability.

37 Claims, 3 Drawing Figures

PNEUMATIC TIRE CONTAINING GEL LUBRICANT

This invention relates to gel systems, particularly to gelled lubricants suitable for lubricating the interior of a pneumatic tire and wheel assembly when run in a deflated or under-inflated condition.

There are now pneumatic tire and wheel assemblies which are designed such that they may be run in a completely deflated or under-inflated condition much more safely than can conventional assemblies. Examples of such assemblies are described in U.K. patent specifications Nos. 1,359,467, 1,359,468 and 1,359,461, and a well-known example of such an assembly is that available under the U.K. registered Trade Mark DENOVO.

In order to reduce the friction between the tire and wheel surfaces which contact each other inside the inflation chamber when an assembly is run in a deflated or under-inflated condition, it has been proposed to lubricate these surfaces by means of a liquid lubricant. A preferred means by which the lubricant is stored inside the inflation chamber is in the form of a grease or gel which is capable of breaking down to release the lubricant when it is required for use. Various lubricants and gels have been proposed, for example those referred to in U.S. patent application Ser. No. 657,057 which is a continuation-in-part of U.S. patent application Ser. No. 392,552, U.S. Pat. No. 3,931,843 and U.S. Pat. No. 3,946,783.

It is found that not any lubricant known for rubber/rubber and rubber/metal lubrication will perform satisfactorily under the extreme conditions encountered in a tire and wheel assembly running in a deflated or under-inflated condition, and obviously the performances of the lubricant and the gel are critical to ensure the safety of the occupants of the vehicle on which the assembly is mounted. For use in such a tire and wheel assembly, at least the following properties of the lubricant and the gel are desirable.

Lubricant a. Good rubber/rubber and rubber/metal lubrication over the temperature range likely to be met in a running deflated or under-inflated assembly, e.g. 25°–80° C.

b. No vaporisation or decomposition to an unsuitable lubricant under the deflated or under-inflated running conditions or under conditions likely to be encountered in a baking oven e.g. at temperatures up to about 150° C.

c. Sufficiently fluid to disperse puncture sealants over the internal tire surface in the event of deflation by puncture.

Lubricant and Gel d. Non-damaging to the tire and wheel e.g. it should not swell the rubber of the tyre or corrode the wheel rim.

e. Water-soluble to facilitate removal and cleaning in the event of leakage, replacement or repair.

f. Good storage-stability, e.g. resistant to oxidation and bacteria.

g. Non-toxic.

h. Non-flammable.

i. Low cost.

j. Good low temperature properties, e.g. having a freezing point not above −20° C.

Gel k. Mechanical stability under the conditions of use of the assembly, i.e. it should not flow when the assembly is stationary or when it is running in the inflated condition.

l. Adherability to the tire and/or wheel rim in the inflation chamber. Accordingly it should wet the tire surface and/or wheel rim.

m. Good ability to be broken down by chemical reagents and/or mechanical forces (e.g. shear) and/or heat, to produce the lubricant when the assembly is run in a deflated or underinflated condition.

n. Ease of application to the assembly, e.g. by spraying.

A particularly suitable lubricant is found to be a poly(alkylene oxide). A variety of gellants has been proposed for increasing the viscosity of this polymer, for example bentonite clays, amide waxes, aluminium stearate, microcrystalline cellulose, colloidal asbestos and silica. A preferred gellant for use in producing a gel for use in a tire and wheel assembly is found to be silica.

It has also been proposed to strengthen the gel network by means of a basic inorganic compound such as sodium carbonate, sodium stearate, sodium bicarbonate or borax. However, it is found that when such a compound is used to strengthen a gel containing the silica gellant proportions found to be desirable to produce a gel for use in a tire and wheel assembly, an acid is required to break down the gel adequately. Also, it is often found that the amount of many strongly basic strengthening compounds employed must be very carefully measured since a small variation in the amount often results in a significantly large change in gel viscosity, and such careful measurement is generally undesirable for a large-scale commercial manufacturing process.

It has also been proposed to employ certain inorganic compounds of Groups I to IV of the Periodic Table, e.g. copper sulphate, aluminium nitrate, aluminium sulphate, cerium tetrasulphate or lithium chloride, as gel breakdown agents.

It is now found that certain ionic metal salts have a desirable strengthening effect on a poly(alkylene oxide)/silica gel without the disadvantages associated with the known basic strengthening compounds. Also, this strengthening effect is in contrast to the function of gel breakdown advocated for many inorganic compounds.

According to the present invention therefore a lubricant gel comprises a poly(alkylene oxide) lubricant gelled with a finely divided silica and a gel-strengthening amount of an ionic salt having a pH in the range 5.5 to 8.5 when in a 0.1 molar aqueous solution.

It is also found that in order for the gel to be suitable for use in a pneumatic tire and wheel assembly, the silica gellant should be selected from a certain class and the ionic salt should be capable of producing a gel of suitable viscosity at a minimum silica loading of at least 7.5 grams per 92.5 grams of poly(alkylene oxide).

According to the present invention also therefore there is provided a pneumatic tire having on its internal surface a coating of a lubricant gel having a viscosity and mechanical stability such that it remains on the tire surface and does not flow when the tyre is in normal use in an inflated tyre and wheel assembly, said gel comprising a poly(alkylene oxide) lubricant gelled with a finely divided silica having a surface area above 150 square meters/gram and a gel-strengthening amount of an ionic salt having a pH in the range 5.5 to 8.5 when in a 0.1 molar aqueous solution, said salt being capable of producing a gel viscosity measured at about 20° C. in the range 3000 to 7000 Newton.seconds per square meter by mixing 2 milliliters of a suitably concentrated aqueous solution of the salt with 100 grams of the poly(alkylene oxide) lubricant and the silica in a lubricant : silica weight ratio of not greater than 92.5 : 7.5.

A tire in accordance with the invention is shown in the accompanying drawings in which.

Figure 1:
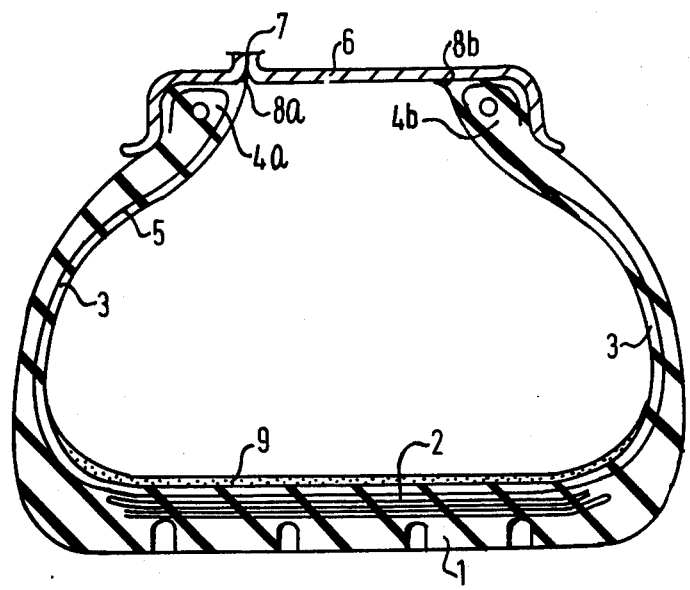
FIG. 1 is a schematic cross-sectional view of the tire having a coating of gelled composition on the interior of the tire tread the tire being in the inflated condition.

As shown in FIG. 1 the tire is a radial tire having a tread 1 braced by a breaker assembly 2 comprising two folded breaker plies, sidewalls 3 and beads 4. A carcass reinforcement 5 consisting of a pair of rayon cord plies having equal and opposite bias angles of 88° relative to the mid-circumferential plane extends from bead to bead.

The tire is shown on a rim 6 narrower than the tread of the tire, and having a notch 7 positioned adjacent its outboard bead seat. Such a rim may be a split rim as described in our U.K. Patent specification Ser. No. 1,432,545, or an axially compressed rim in which a well has been closed up by axial compression as described in our U.K. patent specification Ser. No. 1,348,891.

Each bead 4 of the tire is provided with an extended toe portion 8, that on the outboard bead, 8a, resting in the notch 7 in the rim and that on the inboard bead, 8b, being stretched over the rim.

Figure 2:
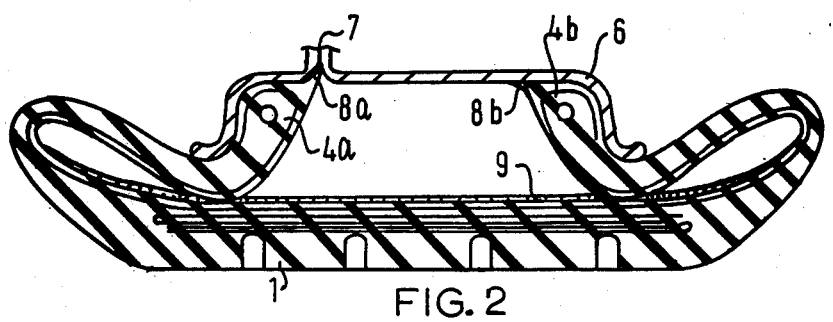
FIG. 2 is a similar view through the tire/ground contact area of the tire with the tire in a deflated condition, under vertical load but not subject to a lateral (e.g. cornering) force.
Figure 3:
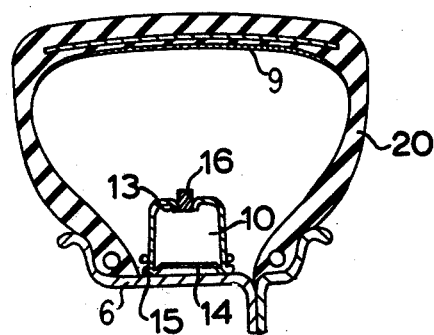
FIG. 3 is a schematic cross-sectional view of an embodiment of the invention showing the tire mounted on a rim to form a wheel assembly and containing a cannister for a gel breakdown agent.

A gelled lubricant composition 9 is coated on the interior of the tread portion of the tire. As shown in FIG. 2, on tire deflation contact takes place between portions of the interior of the tire, but friction between these contacting portions is reduced by an interposed film of the gelled lubricant composition. As shown in FIG. 3 the tire 20 has a gel coating 9 and is fitted on a split rim 6 together with a metal cannister 10 containing a breakdown agent which is held against the rim 6 by a wire band (not shown). The cannister 10 has a hole 12 having a lip 13, the hole being sealed by a peg 16. The bottom of the cannister 14 is seamed at 15 to the remainder. In the event of the tire and wheel assembly being punctured, the deflated tire will push the plug 16 into the container 10 thus releasing the breakdown agent into the tire to mix with the gel coating.

According to the present invention also there is provided a pneumatic tire and wheel assembly containing in the inflation chamber a lubricant gel defined above.

The poly(alkylene oxide) lubricant should preferably have a viscosity (measured at a shear rate of 0.31 s$^{-1}$ at about 20° C.) which does not fall below about 0.07 N.s/m$^2$ under the conditions of running the assembly in a deflated or underinflated condition, for instance at inflation chamber temperatures of 25° C. to 80° C. Since the viscosity usually falls with rise in temperature, a preferred lubricant is one having a viscosity in the region of 0.7-1.0 N.s/m$^2$ at 25° C. Alternatively, the poly(alkylene oxide) itself may have a higher viscosity at 25° C. if it is mixed with an ingredient which lowers the viscosity of the lubricant to an acceptable level, for instance a volatile ingredient such as ethanol.

The poly(alkylene oxide) may have a hydroxyl functionality of one and may suitably be a copolymer containing ethylene oxide and propylene oxide units. Suitable poly(alkylene oxide) lubricants are those available under the trade names "Ucon 50-HB-2000", "Ucon 50-HB-3520" and "Ucon 50-HB-5100". Each of these "Ucon" lubricants is a copolymer containing ethylene oxide and propylene oxide units in a ratio of about 1:1, and has a hydroxyl functionality of one. The preferred lubricant is "Ucon 50-HB-2000". "Ucon 50-HB-3520" and "Ucon 50-HB-5100" should generally be used in conjunction with a volatile ingredient to lower the viscosity. They have the following relevant properties.

| Ucon | Viscosity (N.s/m$^2$) | | Mn | Mw/Mn |
| --- | --- | --- | --- | --- |
| | 25° C. | 80° C. | | |
| 50-HB-2000 | 0.70 | 0.10 | 2501 | 1.53 |
| 50-HB-3520 | 1.20 | 0.17 | — | 1.73 |
| 50-HB-5100 | 2.0 | 0.23 | 3806 | 1.89 |

The number average molecular weights (Mn) were determined by gel permeation chromatography.

For use in a tire and wheel assembly, the lubricant is gelled to achieve a gel having desirable properties of viscosity, flow and ability to be broken down to confer lubrication. The gel preferably has a minimum viscosity of about 2800 N.s/m$^2$ (measured at a shear rate of 0.31 s$^{-1}$ at 20° C.), more preferably at least 3000 N.s/m$^2$. The desirable maximum gel viscosity will depend on the method of applying the gel to the assembly and on the means of breaking the gel down. A gel viscosity of up to 10000 N.s/m$^2$ might be suitable but, for application of the gel by a currently preferred spraying technique, a gel viscosity of no more than 7000 N.s/m$^2$ is preferred. Also, high viscosity gels might require an acid to break them down and this may be undesirable in view of the difficulty of storing the acid and its corrosive effect on the tire and wheel assembly.

The gel is produced by means of a finely divided silica gellant and an ionic salt. When the gel is to be employed in a tire and wheel assembly, the silica should have a large surface area such as above 150 m$^2$/g and preferably at least 200 m$^2$/g. The silica may suitably have a particle diameter below 22 nanometers (nm), for example up to about 16 nm. A preferred silica is a fumed silica, i.e. one prepared by high temperature hydrolysis of silicon tetrachloride. Examples of fumed silicas are those obtainable under the trade names "Aerosil" and "CaboSil", e.g. "Aerosil 300" which has a surface area of about 300 m$^2$/g and a particle diameter of about 12 nm and "CaboSil M5" which has a surface area of about 200 m$^2$/g and a particle diameter of about 12 nm. An alternative silica which may be employed is a hydrated silica, i.e. one containing more than about 3.5% of bound water and usually made by acidifying an alkaline silicate. An example of a suitable hydrated silica is that available under the trade name "Ultrasil VN3" which has a particle diameter of 16 nm. A further example of a suitable silica is a silica sol, e.g. that available under the trade name "Ludox HS40" which has a surface area of about 210–230 m$^2$/g and a particle diameter of about 13–14 nm.

The amount of silica employed is preferably at least 7.5 g per 100 g poly(alkylene oxide) lubricant in order to ensure the absence of liquid separation (syneresis). Generally a smaller amount of fumed silica is employed than is needed in respect of hydrated silica or silica sol in view of the water present in these two silicas. An example of a suitable upper limit of fumed silica is about 10 g per 100 g poly(alkylene oxide) lubricant.

The gel also contains an advantageous gel strengthening agent in the form of an ionic salt which, when in the form of a 0.1 M aqueous solution, has a pH falling in the range 5.5 to 8.5. For use in a tire and wheel assembly the salt should also pass the test of producing a gel viscosity falling within the range 3000 to 7000 $N.s/m^2$ by mixing 2 ml of a solution of it with 100 g of the lubricant and silica in a lubricant : silica weight ratio of not greater than 92.5 : 7.5. Examples of suitable salts are those of strong acids and strong bases, e.g. those in which the cation is an alkali metal (including lithium), an alkaline earth metal (including magnesium) or an ammonium ion, and the anion is a halide, nitrate, sulphate or perchlorate ion. These and other examples of suitable salts are given in the following Table I which shows the pH (measured using a Pye pH meter) of a 0.1 M aqueous solution of each salt and the viscosity (measured at about 20° C. using a Ferranti viscometer at a shear rate of 0.31 $s^{-1}$ and after at least 2 days standing) of a gel formed by mixing 2 ml of a 0.1 M aqueous solution of each salt with 100 g of a mixture of a poly(alkylene oxide) lubricant available under the trade name "Ucon 50-HB-2000 Y3Y24" and a fumed silica available under the trade name "Aerosil 300" in a lubricant : silica weight ratio of 91.5 : 8.5. Also given in the table is the viscosity of the gel without any additive and the viscosity of the gel mixed with 2 ml of water.

TABLE I

| Additive | pH | Gel Viscosity ($N.s/m^2$) |
| --- | --- | --- |
| None | — | 483 |
| Water | — | 2180–2530 |
| Potassium chloride | 7.5 | 3990–4150 |
| Potassium iodide | 7.2 | 7600–7720 |
| Potassium bromide | 7.3 | 3820–4230 |
| Potassium perchlorate | 7.4 | 3500–3620 |
| Sodium chloride | 6.0 | 3380–3600 |
| Sodium bromide | 7.7 | 5670–5800 |
| Sodium iodide | 7.3 | 7600–7720 |
| Sodium fluoride | 6.5 | 5070–5200 |
| Sodium nitrate | 8.1 | 3510–3560 |
| Sodium oxalate | 7.5 | 5670–6040 |
| Sodium perchlorate | 7.2 | 4350–4710 |
| Ammonium chloride | 5.8 | 4220–4460 |
| Ammonium bromide | 6.6 | 4350–4600 |
| Ammonium fluoride | 6.2 | 5850–6150 |
| Ammonium nitrate | 6.4 | 4000–4230 |
| Lithium chloride | 7.3 | 2960–3020 |
| Lithium nitrate | 8.4 | 3380–3740 |
| Lithium fluoride | 7.5 | 5350–5440 |
| Magnesium chloride | 8.0 | 3020–3620 |
| Calcium chloride | 6.3 | 3260–3620 |
| Barium chloride | 6.4 | 4840–5080 |
| Barium nitrate | 7.3 | 5080–5550 |
| Zinc acetate | 6.7 | 2900–3140 |
| Lead acetate | 6.5 | 6150–6160 |
| Silver nitrate | 6.4 | 3620–3740 |
| Cadmium chloride | 6.4 | 3140–3180 |
| Cadmium iodide | 7.1 | 5310–5440 |

The gel viscosities produced by the iodides may be reduced by using an aqueous solution having a molar concentration of less than 0.1 M.

As mentioned hereinbefore, the salts employed in the present invention are distinct from the highly basic salts (i.e. pH above 8.5) previously recommended as gel strengthening agents. Also, the salts employed in the present invention are distinct from salts having a lower pH in 0.1 M aqueous solution. Examples of such salts are given in the following Table II in which the table headings have the same meaning as for Table I.

TABLE II

| Additive | pH | Gel Viscosity ($N.s/m^2$) |
| --- | --- | --- |
| None | — | 483 |
| Water | — | 2180–2530 |
| Sodium bisulphate | 2.1 | 1450–1510 |
| Potassium bisulphate | 2.1 | 1810 |
| Ferrous chloride | 2.8 | 605–725 |
| Ferrous sulphate | 3.8 | 605–640 |
| Ferric chloride | 1.8 | 605 |
| Cupric chloride | 4.0 | 665–724 |
| Cupric sulphate | — | 652–665 |
| Aluminium chloride | 3.1 | 1090 |
| Aluminium sulphate | — | 495–506 |
| Aluminium nitrate | 3.1 | 965–1030 |
| Chromic chloride | 2.3 | 810–845 |
| Chromic sulphate | 2.2 | 605–616 |
| Cerric sulphate | 1.7 | 605–616 |
| Stannic chloride | — | 820–845 |

It can be seen that the gel viscosity obtained using these salts is lower than when the same quantity of water is used. Also it is found that the gel viscosity remains low when different amounts and molar concentrations of these salts are used. Thus these salts have a viscosity reducing effect rather than a reinforcing effect.

Also, certain salts having a pH within the present invention, such as lithium chloride, have previously been recommended as gel breakdown agents. Surprisingly, we have found that in the present invention such a salt may be employed to have the exact opposite effect, i.e. act as a gel strengthening agent. We have found that lithium chloride and other salts employed in this invention act as gel breakdown agents only when employed with a large amount of water and thus it appears to be really the water, not the salt per se, which is acting as the breakdown agent. Accordingly, as an increasing proportion of an aqueous salt solution of given molarity is added to a lubricant/silica mixture, the viscosity of the gel increases to a maximum and then decreases.

The tire and wheel assembly may also contain a puncture sealant and/or means to at least partially re-inflate the tire when the tire becomes deflated or under-inflated. Other ingredients such as a rust inhibiter and an antioxidant may also be present. One or more of these may be incorporated in the lubricant gel. Examples of puncture sealants are rubber crumb, polyethylene flakes and short fibres (about 2.5 mm long) of for example cotton, asbestos or nylon. The means to reinflate the tire may be a volatile ingredient which vaporises under the deflated or under-inflated running conditions, for example water, methanol or ethanol, or two or more ingredients which react to produce a gas or vapour.

The gel is preferably carried in the inflation chamber as a coating on the tire, especially on the interior surface of the tread portion.

The lubricant gel may be broken down by shear and/or heat and/or a chemical reagent such as a low pH (e.g. 4 or less) salt solution referred to hereinbefore, a large amount of water, an acid, an aprotic solvent or an alcohol e.g. ethylene glycol, propylene glycol, methanol or ethanol or a mixture of some of them e.g. a water/propylene glycol/methylated spirits mixture. The chemical reagent may be injected into the inflation chamber of the deflated tire, for example through the inflation valve, but preferably it is housed in the chamber during normal inflated running and is released automatically when deflation or substantial under-inflation occurs. The chemical reagent may suitably be housed in one or more canisters attached to the wheel rim such that they release the reagent under pressure of the tire when the assembly is run in the deflated or underinflated condition.

The lubricant gel is especially useful for use in tire and wheel assemblies which are specially designed to run in a deflated or under-inflated condition. The tread portion of the tire may be wider than the distance between the bead heels when fitted on the wheel and the tyre may have a low aspect ratio, for example 25–75% or, for general road use, 50–75%. The wheel rim and/or tire may be shaped to retain the tire securely on the wheel when the assembly is run deflated.

In addition to the desirable gel properties previously mentioned, the gel of the invention should preferably pass the following tests.

1. It should not flow when a glass plate having a 2 mm thick layer of it is suspended in a vertical plane at 20°–22° C. for 16 hours.
2. There should be less than 5% separation of liquid during storage at 100° C. for 48 hours.
3. There should be less than 5% separation of liquid when the gel is centrifuged over an 18 cm radius at 2000 revolutions per minute at 55° C. for 5 hours.
4. It should break down rapidly when 18 g of it are shaken with a mixture of 5 ml propylene glycol, 2 ml industrial methylated spirits and 5 ml water at 20°–22° C.
5. It should be capable of being applied by spraying.

The invention is further illustrated in the following Examples.

EXAMPLE I

Greases of "Ucon 50-HB-2000Y3Y24" ("Y3Y24" indicates that small amounts of antioxidant and rust inhibitor are present) and the fumed silica "Aerosil 300" in lubricant : silica weight ratios of 91.6 : 8.4, 91.3 : 8.7 and 91.0 : 9.0 were made by the following procedure. 80% of the total amount of the "Ucon" were mixed with the total amount of the silica in a "Hobart" mixer using a dough stirrer at slow speed. The rest of the "Ucon" was then added and the mixture was stirred at a high speed for 4 minutes. The mixing was performed at room temperature (about 20°–22° C.).

The resulting greases were allowed to stand at room temperature for 14 days (although such a long period is not necessary) and then 2 ml of water or an aqueous salt solution were stirred into 100 g of each grease at room temperature in a 76.2 mm diameter beaker using a paddle stirrer which was 63.5 mm wide and 25.4 mm deep. The stirrer was connected to a variac at a constant setting. The stirrer speed at the start was about 50 revolutions per minute and at the end it was about 195 revolutions per minute owing to the thixotropy of the mixture. The stir time was 3 minutes.

The resulting gels were allowed to stand for 2 to 8 days to obtain a stable viscosity and then their viscosities were measured at room temperature (about 20°–22° C.) using a portable Ferranti viscometer at a shear rate of 0.31 s$^{-1}$.

This procedure was performed using aqueous sodium chloride solutions of various concentrations and the results are shown below.

| Additive | Viscosity (N.s/m$^2$) | | |
| --- | --- | --- | --- |
| | A | B | C |
| None | 483 | 904–1030 | 1330 |
| Water | 2180–2530 | — | — |
| 0.1M NaCl | 3140–3600 | 3990–4350 | 6270–6340 |
| 0.25M NaCl | 5320–5450 | — | — |
| 0.50M NaCl | — | 5670–5910 | — |
| 0.75M NaCl | 4600–4840 | — | — |
| 1.00M NaCl | 4950–5420 | 6280–6510 | — |
| 2.00M NaCl | 4950–5050 | 6280–6760 | — |
| 3.00M NaCl | — | — | 5910–5440 |
| 5.00M NaCl | — | — | 7600–7730 |

Grease A contained 8.4% silica
Grease B contained 8.7% silica
Grease C contained 9.0% silica

EXAMPLE II

The procedure of Example I was followed using grease A and different salt solutions. The results are given below.

| Additive | Viscosity at given salt concentration (N.s/m$^2$) | | |
| --- | --- | --- | --- |
| | 0.1M | 1.0M | 2.0M |
| None | 483 | 483 | 483 |
| Water | 2180–2530 | 2180–2530 | 2180–2530 |
| Sodium nitrate | 3510–3560 | — | 5300–5420 |
| Sodium sulphate | 2060–2120 | — | 4950–5060 |
| Zinc acetate | 2900–3140 | 6040–6160 | — |
| Zinc nitrate | 1690–1810 | 1750–1930 | — |

It is evident that zinc nitrate is unsuitable and that sodium sulphate is suitable at a concentration of 2.0M.

EXAMPLE III

The procedure of Example I was repeated using greases A and C and various amounts and concentrations of aqueous sodium chloride solution. The results are given below.

| ml of solution per 100 g grease | 0.1M A | 0.5M C | 1.0M C | 2.0M C |
| --- | --- | --- | --- | --- |
| None | 483 | 1330 | 1330 | 1330 |
| 1.0 | 3500–4100 | 6150–6320 | 4830–5160 | 4830 |
| 2.0 | 3140–3600 | — | — | — |
| 2.5 | 4720–4950 | — | — | — |
| 3.0 | 4720–5420 | 6510–6760 | 5550–5670 | 5310–5440 |
| 3.5 | 4600–4840 | — | — | — |
| 4.5 | 4600–4720 | — | — | — |
| 5.0 | 3860–4100 | 3860–3990 | 4460 | 4460–4590 |
| 7.0 | 3980–4220 | — | — | — |
| 7.5 | — | 3380–3500 | 3860–3990 | 4230–4350 |
| 8.0 | 2300–2540 | — | — | — |
| 9.0 | 1690–1930 | — | — | — |
| 10.0 | 362–386 | 3500–3620 | 3500–3620 | 4230–4460 |

EXAMPLE IV

The procedure of Example I was repeated using grease B and various amounts of a 0.1M aqueous solution of various salts. The results are given below.

| ml of solution per 100 g grease | NaNO$_3$ | NH$_4$Cl | KBr | CaCl$_2$ | ZnAc$_2$ |
| --- | --- | --- | --- | --- | --- |
| None | 904–1030 | 904–1030 | 904–1030 | 904–1030 | 904–1030 |
| 1 | 3560–3800 | 4590–4720 | 6040–6220 | 3020–3140 | 2300–242 |

-continued

| ml of solution per 100 g grease | NaNO₃ | NH₄Cl | KBr | CaCl₂ | ZnAc₂ |
|---|---|---|---|---|---|
| 3 | 3680–3870 | 4720–4840 | 7120–7250 | 3020 | 5140–520 |
| 5 | 2840–2900 | 5550–5680 | 4100–4120 | 1750–1810 | 5680–580 |
| 7.5 | 2060–2300 | 2900–3020 | 3500–3630 | 1810–1990 | 2060–230 |
| 10 | 2060–2180 | 2420–2540 | 3260–3380 | 1990–2050 | — |

ZnAc₂ = zinc acetate.

EXAMPLE V

A grease was made as described in Example I using a lubricant : silica ratio of 90.4 : 9.6. It was allowed to stand at room temperature for 14 days and then 2 ml of water or of an aqueous solution of trisodium phosphate were manually stirred into 100 g of the grease using a spatula for 1 minute. The gel viscosity was measured as described in Example I and the results are given below.

| Molarity | Viscosity (N.s/m²) |
|---|---|
| None | 2540–2600 |
| 0.03M | 8810 - more than 12000 |
| 0.075M | more than 12090 |
| 0.15M | " |
| 0.3M | " |
| 0.6M | " |

It can be seen that a relatively small change in the amount of Na₃PO₄ results in a large change in viscosity and that the viscosity is very high at a very small amount of Na₃PO₄. It was found that the gels produced from the molarities 0.15M and above could not be adequately broken down when 15 g of each gel were mixed with 10 ml of a 5:5:2 volume mixture of propylene glycol:water:alcohol.

EXAMPLE VI

Attempts were made to produce gels from "Ucon 50-HB-2000 Y3Y24" using various gellants in place of those employed in the present invention. The grease preparation procedure in each case was that which was most suitable for the particular gellant employed. 2 ml of water or of a 0.1M aqueous sodium chloride solution were mixed with the greases as described in Example I and the viscosities of the products were measured as described in Example I. The results are given below.

| | Viscosity (N.s/m²) | | |
|---|---|---|---|
| Gellant | Initial grease | 2% water added | 2% 0.1M NaCl added |
| "Bentone 27" (25%) | 363–424 | 1690 | 129–135 |
| "Glokem DMS" (10%) | 4230–4775 | 61 | 97–125 |
| "Avibest C" (5%) | 966–1090 | — | 1810–1940 |
| "Avicel" (25%) | no gel formed | | |
| Aluminium stearate (25%) | gels formed only in the presence of a base (e.g. Na₂CO₃). | | |

"Bentone 27" is an organically modified bentonite clay.
"Glokem DMS" is a long-chain amide wax.
"Avibest C" is a colloidal asbestos.
"Avicel" is a colloidal cellulose.

It can be seen that only the "Avibest C" grease gave an increase in viscosity when the salt solution was added; however, the viscosity is still low and it suffers from liquid separation on standing. Also, it is found that greases made using "Glokem DMS" have poor thermal stability, greases made using "Avicel" have limited thermal stability and are expensive in view of the large amount of gellant needed, and greases made using "Bentone 27" have poor centrifugal and thermal stabilities and are expensive in view of the large amount of gellant needed.

In preparing gels of the present invention, it is not necessary to add the salt to a pre-prepared lubricant-/silica grease; the lubricant, silica and salt may be mixed together in one go. Also, it is not necessary to use the particular mixing techniques described in the Examples. One example of a suitable alternative to a "Hobart" mixer is a 3-roll paint mill.

What we claim is:

1. A pneumatic tire having on its internal surface a coating of a lubricant gel having a viscosity and mechanical stability such that it remains on the tire surface and does not flow when the tire is in normal use in an inflated tire and wheel assembly, said gel comprising a poly(alkylene oxide) lubricant gelled with a finely divided silica having a surface area above 150 square meters/gram and a gel-strengthening amount of an ionic salt having a pH in the range 5.5 to 8.5 when in a 0.1 molar aqueous solution, said salt being capable of producing a gel viscosity (measured at 20° C at a shear rate of 0.31 reciprocal seconds) in the range 3000 to 7000 Newton.seconds per square meter by mixing 2 milliliters of a suitably concentrated aqueous solution of the salt with 100 grams of the poly(alkylene oxide) lubricant and the silica in a lubricant:silica weight ratio of not greater than 92.5:7.5.

2. A pneumatic tire according to claim 1 in which the gel comprises a lubricant having a viscosity (measured at a shear rate of 0.31 s⁻¹ at 20° C) which does not fall below 0.07 N.s/m² over the temperature range 25° C to 80° C.

3. A pneumatic tire according to claim 1 in which the gel comprises a lubricant having a visocosity (measured at a shear rate of 0.31 s⁻¹ at 20° C) in the range 0.7 to 1.0 N.s/m² at 25° C.

4. A pneumatic tire according to claim 3 in which the viscosity of the lubricant is lowered into the range 0.7 to 1.0 N.s/m² by means of a volatile ingredient such as ethanol.

5. A pneumatic tire according to claim 1 in which the poly(alkylene oxide) has a hydroxyl functionality of 1.

6. A pneumatic tire according to claim 1 in which the poly(alkylene oxide) is a copolymer containing ethylene oxide and propylene oxide units.

7. A pneumatic tire according to claim 1 in which the poly(alkylene oxide) is a copolymer containing ethylene oxide and propylene oxide units in the ratio of approximately 1:1, having a hydroxyl functionality of 1, a viscosity at 25° C of 0.70 N.s/m², a viscosity at 80° C of 0.10 N.s/m², a Mn of 2501 and a Mw/Mn of 1.53.

8. A pneumatic tire according to claim 1 in which the silica has a surface area at least 200 m²/g.

9. A pneumatic tire according to claim 1 in which the silica has a particle diameter below 22 nm.

10. A pneumatic tire according to claim 9 in which the silica has a particle diameter of up to 16 nm.

11. A pneumatic tire according to claim 1 in which the silica is fumed silica.

12. A pneumatic tire according to claim 11 in which the fumed silica has a surface area of about 300 m$^2$/g and a particle diameter of about 12 nm.

13. A pneumatic tire according to claim 1 in which the silica is a hydrated silica or a silica sol.

14. A pneumatic tire according to claim 1 in which the amount of silica is at least 7.5 g per 100 g of poly(alkylene oxide) lubricant.

15. A pneumatic tire according to claim 1 in which the amount of silica is up to 10 g per 100 g of poly(alkylene oxide) lubricant.

16. A pneumatic tire according to claim 1 in which the salt is a salt of a strong acid and a strong base.

17. A pneumatic tire according to claim 1 in which the cation of the salt is selected from the group consisting of alkali metal (including lithium), alkaline earth metal (including magnesium) and ammonium ions and the anion of the salt is selected from the group consisting of halide, nitrate, sulphate and perchlorate ions.

18. A pneumatic tire according to claim 1 in which the salt is selected from the group consisting of sodium oxalate, zinc acetate, lead acetate, silver nitrate, cadmium chloride and cadmium iodide.

19. A pneumatic tire according to claim 1 in which the gel is in admixture with a pneumatic tire puncture sealant such as rubber crumb, polyethylene flakes or short fibers of cotton, asbestos or nylon.

20. A pneumatic tire according to claim 1 in which the gel is in admixture with a rust inhibitor.

21. A pneumatic tire according to claim 1 in which the gel is in admixture with an antioxidant.

22. A pneumatic tire according to claim 1 in which the gel is capable of being broken down by means of shear and/or heat and/or a chemical reagent.

23. A pneumatic tire according to claim 22 in which the chemical reagent is selected from the group consisting of salts whose 0.1 M aqueous solution has a pH of 4 or less, water, acids, aprotic solvents and alcohols.

24. A pneumatic tire according to claim 1 in which the gel does not flow when a glass plate having a 2 mm thick layer of it is suspended in a vertical plane at 20° to 22° C for 16 hours.

25. A pneumatic tire according to claim 1 in which the gel suffers less than 5% separation of liquid when it is stored at 100° C for 48 hours.

26. A pneumatic tire according to claim 1 in which the gel suffers less than 5% separation of liquid when it is centrifuged over an 18 cm radius at 2000 revolutions per minute at 55° C for 5 hours.

27. A pneumatic tire according to claim 1 in which the gel is capable of being applied by spraying.

28. A pneumatic tire according to claim 1 in which the tread portion is wider than the distance between the bead heels when fitted on a wheel.

29. A pneumatic tire according to claim 1, having an aspect ratio of 25% to 75%.

30. A pneumatic tire as defined in claim 1, said tire being mounted on a rim to form a wheel assembly.

31. A pneumatic tire as defined in claim 3, said tire being mounted on a rim to form a wheel assembly.

32. A pneumatic tire as defined in claim 4, said tire being mounted on a rim to form a wheel assembly.

33. An assembly according to claim 30 containing means to at least partially reinflate the tire when the tire becomes deflated or under-inflated.

34. An assembly according to claim 33 in which the re-inflation means is a volatile ingredient such as water, methanol or ethanol or is 2 or more ingredients which react to produce a gas or vapour.

35. An assembly according to claim 30 containing a gel breakdown agent selected from the group consisting of water, acids, aprotic solvents, alcohols and salts whose 0.1 M aqueous solution has a pH of 4 or less.

36. An assembly according to claim 35 in which the breakdown agent is a mixture of water, propylene glycol and methylated spirits.

37. An assembly according to claim 35 in which the breakdown agent is housed in one or more canisters attached to the wheel rim such that they release the breakdown agent under the pressure of the tire when the assembly is run in a deflated or under-inflated condition.

* * * * *